(12) United States Patent
Friedlander et al.

(10) Patent No.: US 8,370,350 B2
(45) Date of Patent: Feb. 5, 2013

(54) USER ACCESSIBILITY TO RESOURCES ENABLED THROUGH ADAPTIVE TECHNOLOGY

(75) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 12/875,261

(22) Filed: Sep. 3, 2010

(65) Prior Publication Data

US 2012/0059815 A1 Mar. 8, 2012

(51) Int. Cl.
*G06F 7/00* (2006.01)
*G06F 17/30* (2006.01)

(52) U.S. Cl. ........ 707/733; 707/734; 707/736; 707/752; 707/754; 707/758

(58) Field of Classification Search .................. 707/705, 707/722, 736, 748, 749, 752, 754, 758, 999.1, 707/999.3, 732, 733, 734
See application file for complete search history.

(56) References Cited

U.S. PATENT DOCUMENTS

| | | | |
|---|---|---|---|
| 5,148,365 A | 9/1992 | Dembo | |
| 5,216,593 A | 6/1993 | Dietrich et al. | |
| 6,102,856 A | 8/2000 | Groff et al. | |
| 6,164,975 A * | 12/2000 | Weingarden et al. | 434/322 |
| 6,272,483 B1 | 8/2001 | Joslin et al. | |
| 6,449,641 B1 | 9/2002 | Moiin et al. | |
| 6,604,160 B1 | 8/2003 | Le et al. | |
| 7,460,019 B2 | 12/2008 | Henderson | |
| 7,464,147 B1 | 12/2008 | Fakhouri et al. | |
| 7,516,142 B2 | 4/2009 | Friedlander et al. | |
| 7,584,160 B2 | 9/2009 | Friedlander et al. | |
| 7,630,948 B2 | 12/2009 | Friedlander et al. | |
| 7,647,288 B2 | 1/2010 | Friedlander et al. | |
| 7,702,605 B2 | 4/2010 | Friedlander et al. | |
| 7,801,885 B1 | 9/2010 | Verma | |
| 7,933,228 B2 | 4/2011 | Coley | |
| 8,001,008 B2 * | 8/2011 | Engle | 705/26.62 |
| 8,010,516 B2 | 8/2011 | Ishii et al. | |
| 2002/0019764 A1 * | 2/2002 | Mascarenhas | 705/10 |
| 2002/0059201 A1 * | 5/2002 | Work | 707/3 |
| 2002/0115447 A1 * | 8/2002 | Martin et al. | 455/456 |
| 2002/0182573 A1 * | 12/2002 | Watson | 434/236 |
| 2003/0033180 A1 | 2/2003 | Shekar et al. | |
| 2003/0065544 A1 | 4/2003 | Elzinga et al. | |
| 2005/0004828 A1 | 1/2005 | DeSilva et al. | |
| 2005/0222989 A1 | 10/2005 | Haveliwala et al. | |
| 2006/0184412 A1 | 8/2006 | Kagan et al. | |

(Continued)

OTHER PUBLICATIONS

U.S. Appl. No. 13/253,431—Specification Filed Oct. 5, 2011.

(Continued)

*Primary Examiner* — Hares Jami
(74) *Attorney, Agent, or Firm* — John R. Pivnichny; Law Office of Jim Boice

(57) ABSTRACT

A computer implemented method, system and/or computer program product identify an appropriate resource for a user. A user profile is created for a user. A request, from the user, is received for a requested resource. Based on the user profile, a user-specific scope of the request, which defines a type of resource that is being requested by the user, is established. An identifier of an appropriate resource that meets the user-specific scope of the request is transmitted to the user.

16 Claims, 3 Drawing Sheets

U.S. PATENT DOCUMENTS

| | | | |
|---|---|---|---|
| 2006/0294085 A1* | 12/2006 | Rose et al. | 707/3 |
| 2007/0073654 A1 | 3/2007 | Chow et al. | |
| 2007/0073799 A1* | 3/2007 | Adjali et al. | 709/200 |
| 2007/0112735 A1 | 5/2007 | Holloway et al. | |
| 2007/0174090 A1 | 7/2007 | Friedlander et al. | |
| 2007/0174101 A1 | 7/2007 | Li et al. | |
| 2008/0147694 A1 | 6/2008 | Ernest et al. | |
| 2008/0155104 A1 | 6/2008 | Quinn et al. | |
| 2008/0209493 A1* | 8/2008 | Choi et al. | 725/119 |
| 2008/0246629 A1 | 10/2008 | Tsui et al. | |
| 2008/0281974 A1* | 11/2008 | Slothouber et al. | 709/229 |
| 2009/0138300 A1 | 5/2009 | Kagan et al. | |
| 2009/0287674 A1 | 11/2009 | Bouillet et al. | |
| 2009/0287683 A1* | 11/2009 | Bennett | 707/5 |
| 2009/0299928 A1 | 12/2009 | Kongtcheu | |
| 2010/0077438 A1 | 3/2010 | Ansari | |
| 2010/0228715 A1 | 9/2010 | Lawrence | |
| 2011/0054968 A1 | 3/2011 | Galaviz | |

OTHER PUBLICATIONS

U.S. Appl. No. 12/903,376—Specification Filed Oct. 13, 2010.

U.S. Appl. No. 13/253,431—Non-Final Office Action Mailed Nov. 10, 2011.

U.S. Appl. No. 12/884,665—Specification Filed Sep. 17, 2010.

U.S. Appl. No. 12/884,665—Non-Final Office Action Mailed Apr. 11, 2012.

U.S. Appl. No. 12/851,995—Specification Filed Aug. 6, 2010.

T. Vercauteren et al., "Hierarchical Forecasting of Web Server Workload Using Sequential Monte Carlo Training", IEEE Transactions on Signal Processing, vol. 55, No. 4, pp. 1286-1297, Apr. 2007.

P. Palazzari et al., "Synthesis of Pipelined Systems for the Contemporaneous Execution of Periodic and Aperiodic Tasks With Hard Real-Time Constraints", 18th International Parallel and Distributed Processing Symposium, 121. IEEE Comput. Soc, Los Alamitos, CA, USA, 2004, PP, Abstract, one page.

RL Dillon et al., "Optimal Use of Budget Reserves to Minimize Technical and Management Failure Risks During Complex Project Development", IEEE Transactions on Engineering Management, vol. 52, No. 3, Aug. 2005, Abstract, one page.

K. Vanthournout et al., "A Taxonomy for Resource Discovery", Pers Ubiquit Comput 9, pp. 81-89, 2005.

C. Srisuwanrat et al., "Optimal Scheduling of Probabilistic Repetitive Projects Using Completed Unit and Genetic Algorithms", Proceedings of the 2007 Winter Simulation Conference, pp. 2151-2158, 2007.

S. Bharathi et al., "Scheduling Data-Intensive Workflows on Storage Constrained Resources", Works 09, Portland, OR, pp. 1-10 Nov. 15, 2009.

J. Redondo et al., "Solving the Multiple Competitive Facilities Location and Design Problem on the Plane", Massachusetts Institute of Technology, Evolutionary Computation, vol. 17, No. 1, pp. 21-53, 2009.

H. Van et al., "Autonomic Virtual Resource Management for Service Hosting Platforms", Cloud'09, pp. 1-8, May 23, 2009.

U.S. Appl. No. 12/795,847, Specification Filed Jun. 8, 2010.

U.S. Appl. No. 12/851,995—Non-Final Office Action Mailed Apr. 25, 2012.

Robert R. Friedlander et al, U.S. Appl. Serial No. 12/795,847, "Probabilistic Optimization of Resource Discovery, Reservation and Assignment", Filed Jun. 8, 2010.

* cited by examiner

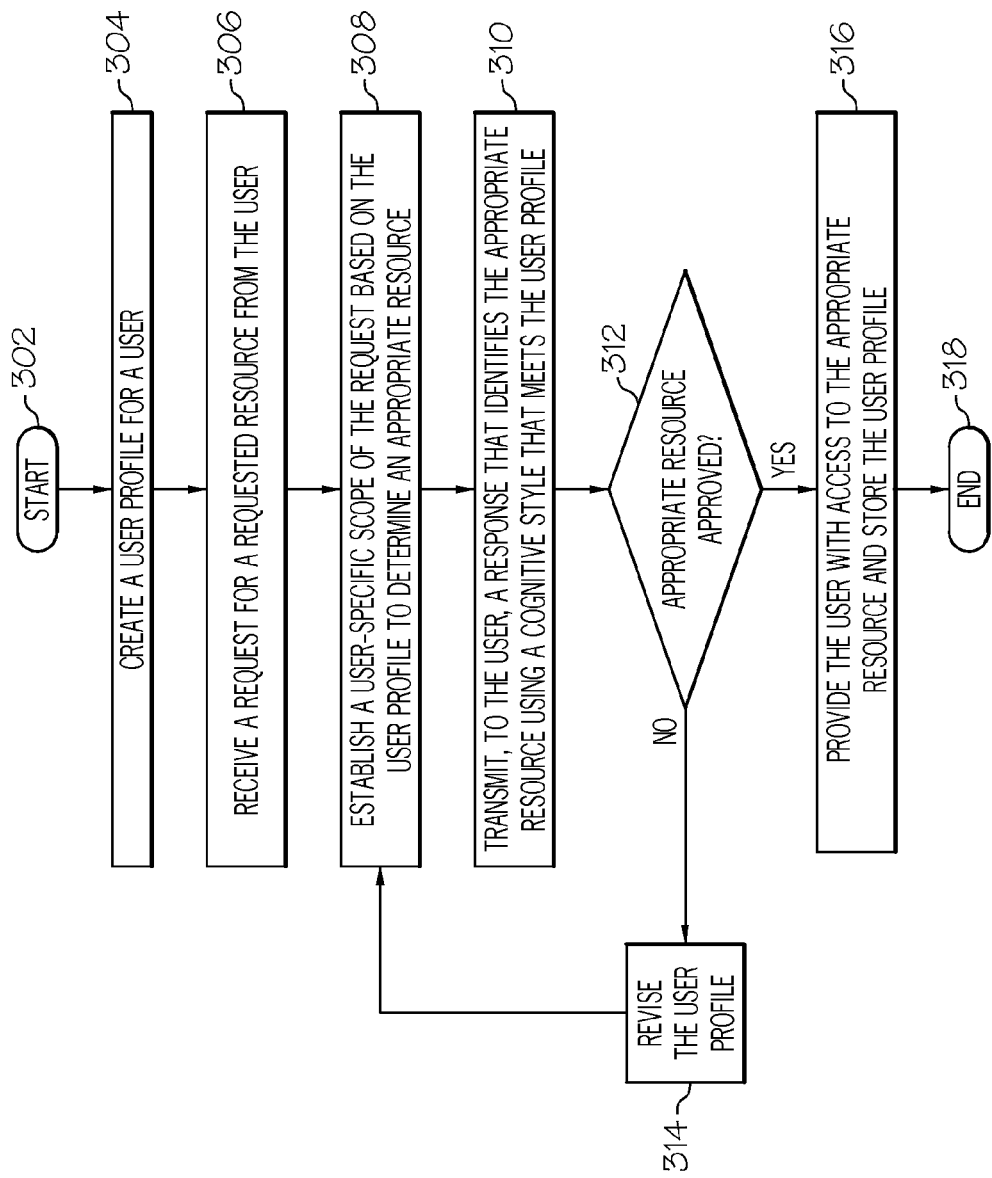

USER ACCESSIBILITY TO RESOURCES ENABLED THROUGH ADAPTIVE TECHNOLOGY

BACKGROUND

The present disclosure relates to the field of computers, and specifically to the use of computers to access resources. Still more particularly, the present disclosure relates to the use of computers in enabling accessibility to resources for users of limited capability.

BRIEF SUMMARY

A computer implemented method, system and/or computer program product identify an appropriate resource for a user. A user profile is created for a user. A request, from the user, is received for a requested resource. Based on the user profile, a user-specific scope of the request, which defines a type of resource that is being requested by the user, is established. An identifier of an appropriate resource that meets the user-specific scope of the request is then transmitted to the user.

BRIEF DESCRIPTION OF THE SEVERAL VIEWS OF THE DRAWINGS

FIG. 3 is a high level flow chart of one or more exemplary steps taken by a processor to identify and/or locate an appropriate resource for a user.

DETAILED DESCRIPTION

Figure 1:
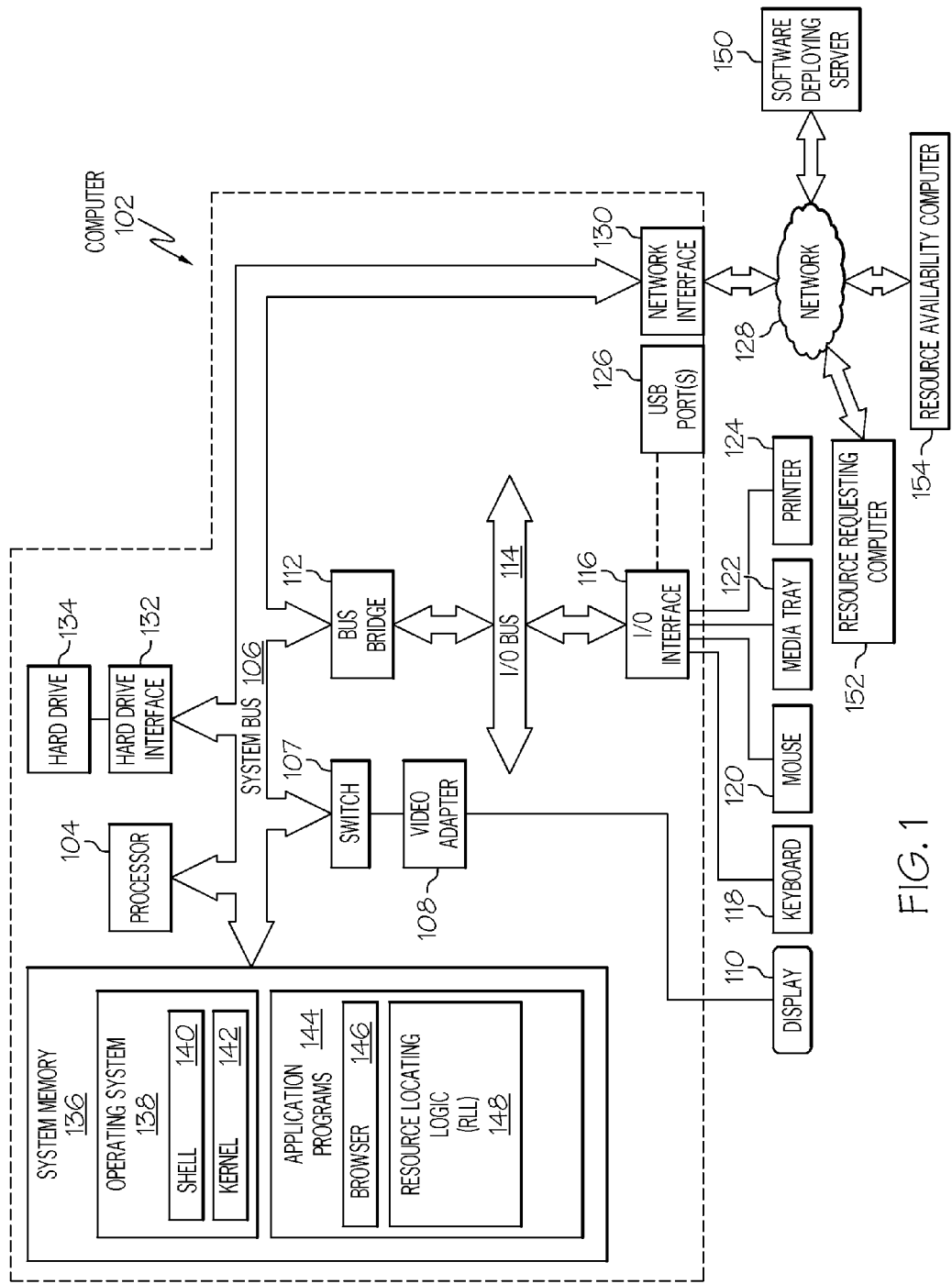
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, resource requesting computer 152 and/or resource availability computer 154.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, resource requesting computer 152 and/or resource availability computer 154 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a resource locating logic (RLL) 148. RLL 148 includes code for implementing the processes described below, including those described in FIGS. 2-3. In one embodiment, computer 102 is able to download RLL 148 from software deploying server 150, including in an on-demand basis, wherein the code in RLL 148 is not downloaded until needed for execution to define and/or implement the improved enterprise architecture described herein. Note further that, in one embodiment of the present invention, software deploying server 150 performs all of the functions associated with the present invention (including execution of RLL 148), thus freeing computer 102 from having to use its own internal computing resources to execute RLL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
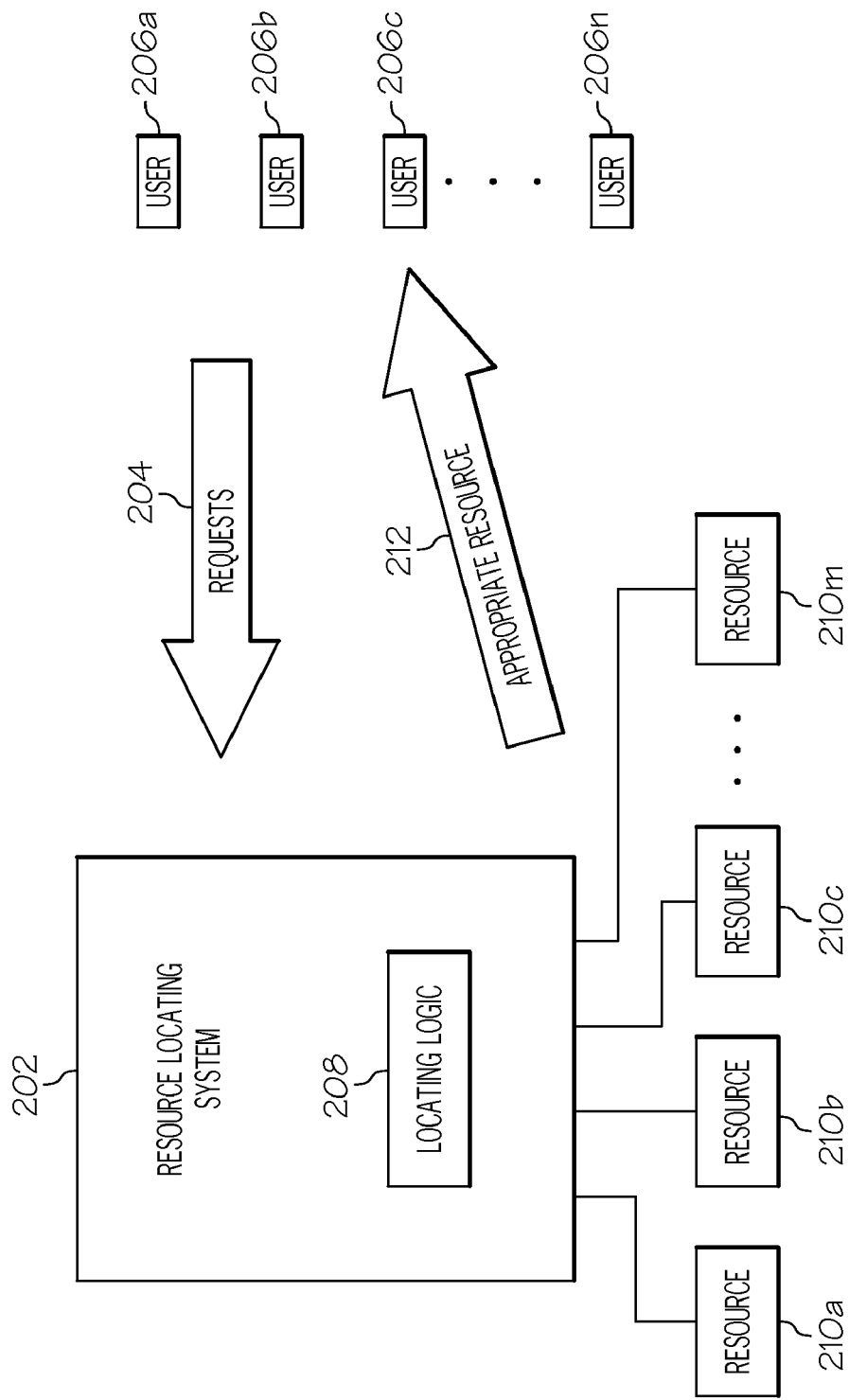
FIG. 2 illustrates relationships among a resource locating system, multiple users, and multiple resources.

Referring now to FIG. 2, relationships among a resource locating system 202, multiple users 206a-n (where "n" is an integer), and multiple resources 210a-m (where "m" is an integer) are presented. In one embodiment, resource locating system 202 can be some or all of computer 102 shown in FIG. 1. Users 206a-n can communicate with resource locating system 202 via a resource requesting computer, such as resource requesting computer 152 shown in FIG. 1. The existence of resources 210a-m, or even the resources 210a-m themselves, can be made known by a resource computer such as resource availability computer 154 shown in FIG. 1. As depicted, resource locating system 202 utilizes locating logic 208 (e.g., RLL 148 shown in FIG. 1) to receive requests 204 for resources from users 206a-n and to process those requests in accordance with a user profile that is specific for that requesting user. In a manner described herein, these requests 204 may ultimately result in an appropriate resource 212 being sent to one or more of the users 206a-n. Note that in various embodiments, one or more of the resources 210a-m are human resources (workers), machinery, hard and soft goods, software, facilities (e.g., meeting rooms, lab equipment, teleconference equipment/materials, etc.), telecommunication bandwidth, services, etc.

With reference now to FIG. 3, a high level flow chart of steps taken to identify, locate, and/or transmit an appropriate resource to a user is presented. After initiator block 302, a user profile is created for a user (block 304). This user profile describes interests of a user, an education level of the user, a career of the user, a geographical area in which the user resides, etc. That is, the user profile describes characteristic of the user, and is not created with reference to prior resource requests from the user or authorizations of the user. That is, the user profile is not a collection of cookies, history, etc. of resources that the user has requested and/or received in the past, nor is the user profile based on any authorizations held by the user (i.e., does the user have an account with the party from whom he is requesting a resource, does he have proper security clearance, etc.). Rather, the user profile describes unique traits/descriptors for the requesting user himself/herself, based on that user's background.

The user profile can be derived in several ways. In one embodiment, a database, including information from web pages that can be crawled to reveal their contents, can be searched. Thus, a search can be made to determine what educational degrees are held by the requesting user, what papers she has published, what organizations she belongs to, who she works for, what projects she has worked on in the past, where she lives, whether she is registered with any licensing or professional organization, etc. This information is used not only to identify and/or locate and/or transmit to the requesting user the appropriate resource that meets her needs, but is also used to determine which cognitive style (i.e., formula-based descriptors such as an equation/algorithm, text-based descriptors (words), graphic-based descriptors (pictures), etc.) best satisfies how the requesting user communicates and/or receives information. That is, while some users are language-oriented (i.e., they communicate best by using words), others are more visual-oriented (i.e., they communicate best by using graphs, pictures, etc.), while others are more abstract oriented (i.e., they communicate best by using formulae, algorithms, computer code, etc.). The determination of which cognitive style best suits a particular user can be achieved by simply asking the user, by examining past communications with the user to identify which styles have been the most productive (i.e., have resulted in the fewest "push-back" or clarification requests, have resulted in the higher percentage of successful conclusions to the request delivery, etc.), or by matching a cognitive style to a persona as described by that user's background from her user profile. Thus, any responses back to the requester are tailored to that requester's preferred cognitive style. For example, if the requesting user asks for a particular type of cloth used to make a garment, one persona (i.e., a writer) may best understand a written description of the material, another (i.e., a visual artist) may best understand a photo/sketch of the material, while another (i.e., a textile engineer) may best understand relatively arcane formulas related to tensile strength, luminescence, etc. that describe the material/cloth.

As described herein, a user profile allows a recipient of a resource request from the user to "understand" what resource/type of resource is actually being requested. For example, assume that the user profile shows that the user works in the entertainment industry. If the user requests a "driver", then he may be looking for a person to drive a car, a number one golf club, a device to interface software and hardware, or an amplifier to power a speaker. However, if the user profile shows that the user works as a computer system programmer, then it becomes clear that he is actually looking for someone skilled in building operating system interfaces to some new piece of hardware.

In another example, assume that the user has requested a "technician". The skill sets of "technicians" varying greatly, depending on what industry is being referenced from the user's profile. That is, an automotive technician (i.e., an auto mechanic) has vastly different skill sets from a science lab technician, who has vastly different skill sets from a nursing technician (i.e., a nurse's aide). Furthermore, within a particular field (i.e., science labs), different types of technicians have vastly different skill sets. That is, a phlebotomist has different skills sets from an electron microscopist, who has different skill sets from a research chemist. As described herein, the user profile will aide in determining what type of technician is needed, as determined by and based on the work, interests, education, credentials, writings, current project(s), etc. of the resource requesting user.

As noted above, the user's profile may also include information about where they live. For example, assume that a requesting user lives in the United Kingdom. If that requester (using resource requesting computer 152 shown in FIG. 1) requests a "boot cover" (from computer 102), then RLL 148, using geographic vernacular-based logic code within RLL 148 and data from the user's profile, will intuit that the requesting user is asking for a tarp to cover part of her automobile. However, if the requesting user is from the state of Texas in the United States, then RLL 148 will assume that the request is for a cloth protective bag used to store her footwear. In either scenario, RLL 148 will then locate the requested resource, and transmit the request (after being appropriately modified to identify the exact resource, part number, request form, etc.) to the resource availability computer 154 that can provide the requested resource.

As described in block 306, a request is received from the user for a requested resource. At this stage, the "requested resource" has either an ambiguous meaning (i.e., "technician"), or alternatively is not really what the requester needs (as determined by his user profile). For example, assume that the requesting user has requested an "economist". However, a review of his user profile reveals that he has never work in the field of economics, but rather has a background in running a business. Therefore, using logic such as RLL 148 and that user's profile, a determination can be made that he really needs an accountant, not an economist. Similarly, if the requester asks for a "typist", RLL 148 and that user's profile may determine that an appropriate resource is actually a speech-to-text software program rather than a worker. In another embodiment, if the requester asks for a worker, an appropriate resource may actually be a machine, such as a computer, a robot, a specialized tool, etc.

Thus, as described in block 308, based on the user profile, a user-specific scope of the request is established. This user-specific scope of the request defines a type of resource that is being requested by the user, even if the user doesn't really know what he needs, as described in the examples stated above. Nonetheless, logic (e.g., RLL 148 shown in FIG. 1) is able to make a determination as to what is actually requested/needed, and identifies this as an appropriate resource that meets the user-specific scope of the request. The identity/descriptor of the appropriate resource is then sent in a response to the requesting user (block 310). In one embodiment, this response is drafted using a cognitive style of the requesting user that matches the cognitive style shown in his user profile. For example, the response may be in text, pictures, formula, code, etc., depending on that requesting user's profile. This response may include a prompt for a return reply, which also will follow the format of the appropriate cognitive style of the requester.

As described in query block 312, a query is made as to whether the requesting user approves of the appropriate resource that has been determined by the receiving logic of the request. The requesting user may not approve. This disapproval may be due to 1) he doesn't like the "appropriate resource" that has been identified by the request receiving logic, or 2) he doesn't like how the "appropriate resource" was presented to him (i.e., the response does not match his cognitive style). At this point, the user profile for that requesting user is revised (block 314), and the process reverts to block 308. In making a change to the user profile, a decision is made as to whether to change the cognitive style entry in the user profile (thus resulting in presenting the same resource using a different approach), or to change the interests entries in the user profile (thus resulting in a different resource being presented to the requesting user). In one embodiment, this decision is based on a default setting (i.e., change the cognitive style entry before changing the interest entries if an extensive set of interest entries is found in the user profile, otherwise change the interest entries without changing the cognitive style entry in the user profile).

Once the requesting user approves of the "appropriate resource" that has been identified by the recipient of the user's request (query block 312), the requesting user is provided with access to the appropriate resource (block 316). This access may be a link to a webpage, an offer to sell/deliver the resource, a link to a database of prospective personnel, etc. The process ends at terminator block 318.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of identifying an appropriate resource for a user, the computer implemented method comprising:
    a processor creating a user profile for a user;
    the processor receiving a request, from the user, for a requested resource;
    the processor establishing, based on the user profile, a user-specific scope of the request, wherein the user-specific scope of the request defines a type of resource that is being requested by the user;
    the processor identifying an appropriate resource that meets the user-specific scope of the request, wherein the appropriate resource is a different type of resource than the requested resource;
    the processor transmitting, to the user, a response that identifies the appropriate resource that meets the user-specific scope of the request;
    the processor matching a cognitive style to the user profile;
    the processor transmitting, to the user, a response that describes the appropriate resource using the cognitive style that matches the user profile;
    the processor, in response to receiving feedback from the user indicating that the appropriate resource satisfies the request, providing the user with access to the appropriate resource and storing the user profile for the user in a persistent storage device;
    the processor determining which cognitive style used to communicate information to the user has a lowest percentage of clarification requests from the user; and
    the processor tailoring any responses back to the user using a cognitive style that has the lowest percentage of clarification requests from the user.

2. The computer implemented method of claim 1, further comprising:
    the processor searching a database of traits of the user to create the user profile.

3. The computer implemented method of claim 2, wherein the database is content from web pages, and wherein the processor searches the web pages using a web crawler.

4. The computer implemented method of claim 1, further comprising:
    the processor matching the cognitive style to the user profile;
    the processor transmitting, to the user, the response that describes the appropriate resource using the cognitive style that matches the user profile; and
    the processor, in response to receiving feedback from the user indicating that the appropriate resource does not satisfy the request, modifying the user profile for the user.

5. The computer implemented method of claim 4, wherein the cognitive style is selected, based on the user profile, from a group of cognitive style descriptors consisting of a formula-based descriptor, a text-based descriptor, and a graphic-based descriptor of the appropriate resource, wherein the formula-based descriptor uses a formula to communicate information to the user, wherein the text-based descriptor uses text words to communicate information to the user, and wherein the graphic-based descriptor uses pictures to communicate information to the user.

6. The computer implemented method of claim 5, wherein the requested resource is a worker and the appropriate resource is a computer-based resource.

7. The computer implemented method of claim 1, wherein the user profile is created without reference to prior resource requests from the user or authorizations of the user.

8. The computer implemented method of claim 1, wherein the user profile describes an education level of the user.

9. The computer implemented method of claim 1, wherein the user profile describes a career of the user.

10. The computer implemented method of claim 1, wherein the user profile describes a geographical area in which the user resides, and wherein the appropriate resource is identified according to a local vernacular of persons within the geographical area.

11. A computer program product for identifying an appropriate resource for a user, the computer program product comprising:
 a non-transitory computer readable storage media;
 first program instructions to create a user profile for a user;
 second program instructions to receive a request, from the user, for a requested resource;
 third program instructions to establish, based on the user profile, a user-specific scope of the request, wherein the user-specific scope of the request defines a type of resource that is being requested by the user;
 fourth program instructions to identify an appropriate resource that meets the user-specific scope of the request, wherein the appropriate resource is a different type of resource than the requested resource;
 fifth program instructions to transmit, to the user, a response that identifies the appropriate resource that meets the user-specific scope of the request;
 sixth program instructions to match a cognitive style to the user profile;
 seventh program instructions to transmit, to the user, a response that describes the appropriate resource using the cognitive style that matches the user profile;
 eighth program instructions to, in response to receiving feedback from the user indicating that the appropriate resource satisfies the request, provide the user with access to the appropriate resource and storing the user profile for the user in a persistent storage device;
 ninth program instructions to determine which cognitive style used to communicate information to the user has a lowest percentage of clarification requests from the user; and
 tenth program instructions to tailor any responses back to the user using a cognitive style that has the lowest percentage of clarification requests from the user; and wherein
 the first, second, third, fourth, fifth, sixth, seventh, eighth, ninth, and tenth program instructions are stored on the computer readable storage media.

12. The computer program product of claim 11, further comprising:
 eleventh program instructions to search a database of traits of the user to create the user profile, wherein the database is content from web pages, and wherein the search of the web pages uses a web crawler; and wherein the eleventh program instructions are stored on the computer readable storage media.

13. The computer program product of claim 12, wherein the cognitive style is selected, based on the user profile, from a group consisting of a formula-based descriptor, a text-based descriptor, and a graphic-based descriptor of the appropriate resource.

14. A computer system comprising:
 a central processing unit (CPU), a computer readable memory, and a computer readable storage media;
 first program instructions to create a user profile for a user;
 second program instructions to receive a request, from the user, for a requested resource;
 third program instructions to establish, based on the user profile, a user-specific scope of the request, wherein the user-specific scope of the request defines a type of resource that is being requested by the user;
 fourth program instructions to identify an appropriate resource that meets the user-specific scope of the request, wherein the appropriate resource is a different type of resource than the requested resource;
 fifth program instructions to transmit, to the user, a response that identifies the appropriate resource that meets the user-specific scope of the request;
 sixth program instructions to match a cognitive style to the user profile;
 seventh program instructions to transmit, to the user, a response that describes the appropriate resource using the cognitive style that matches the user profile;
 eighth program instructions to, in response to receiving feedback from the user indicating that the appropriate resource satisfies the request, provide the user with access to the appropriate resource and storing the user profile for the user in a persistent storage device;
 ninth program instructions to determine which cognitive style used to communicate information to the user has a lowest percentage of clarification requests from the user; and
 tenth program instructions to tailor any responses back to the user using a cognitive style that has the lowest percentage of clarification requests from the user; and wherein
 the first, second, third, fourth, fifth, sixth, seventh, eighth, ninth, and tenth program instructions are stored on the computer readable storage media for execution by the CPU via the computer readable memory.

15. The computer system of claim 14, further comprising:
 eleventh program instructions to search a database of traits of the user to create the user profile, wherein the database is content from web pages, and wherein the computer system searches the web pages using a web crawler; and wherein
 the eleventh program instructions are stored on the computer readable storage media for execution by the CPU via the computer readable memory.

16. The computer system of claim 15, wherein the cognitive style is selected, based on the user profile, from a group consisting of a formula-based descriptor, a text-based descriptor, and a graphic-based descriptor of the appropriate resource.

* * * * *